United States Patent Office 2,699,439
Patented Jan. 11, 1955

2,699,439

PENICILLIN SALTS OF THE ACRIDINE SERIES

Gustav Ehrhart and Heinrich Ruschig, Frankfurt (Main), Leonhard Stein, Bad-Soden (Taunus), Walter Aumüller, Frankfurt (Main), Heinz Oeppinger, Hofheim (Taunus), and Ludwig Schörnig, Frankfurt (Main), Germany, assignors to Farbwerke Hoechst Aktiengesellschaft vormals Meister Lucius und Bruning, Frankfurt (Main), Hochst, Germany, a company of Germany No Drawing. Application June 17, 1952,
Serial No. 294,056

Claims priority, application Germany June 22, 1951

1 Claim. (Cl. 260—239.1)

The present invention relates to penicillin and more particularly to penicillin salts of the acridine series.

For many years past, compounds of the acridine series have played an important part in chemo-therapeutics. For instance, 2-ethoxy-6.9-diaminoacridine-lactate is widely used for wound infections of any kind.

Now, we have found that penicillin salts of the acridine series can be prepared by causing penicillin or penicillin metal salts to react with acridines of the following formula:

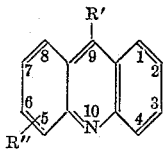

in which the nuclear substituent R' represents H, $NH_2$ or a substituted amino group, R" represents at least one alkyloxy, nitro or amino group, and at least one of the substituents (R', R") represents an amino group or with the salts of these acridine bases. As such bases there may be used: 9-amino-acridine, 9-(hydroxyethylamino)-acridine, 2-ethoxy-9-ethylamino-acridine, 3.6-diamino-acridine, 2-ethoxy-6.9-diamino-acridine, 2.3-dimethoxy-6-nitro - 9 - (gamma - diethylamino - beta - hydroxypropyl)-amino-acridine.

By the present invention the chemo-therapeutical effect of the acridine compounds is considerably supplemented and their field of application is broadened. In the first line, penicillin G is used. As metal salts of penicillin there are used above all alkaline metal salts (including the ammonium salts) and alkaline-earth metal salts.

The penicillin salts are, for instance, prepared as follows: a salt of an acridine as above described is dissolved in water or another solvent and to the solution obtained a solution of the calculated amount of sodium penicillin is added. The penicillin salt precipitates at once; in some cases, it is first oily but becomes crystalline when it is rubbed for a short time with a glass rod. The penicillin salts of the acridine series obtained according to this invention are scarcely soluble in water; they are useful for therapeutic purposes.

The following examples serve to illustrate the invention, but they are not intended to limit it thereto, the parts being by weight:

Example 1

A solution of 2.3 g. of 9-amino-acridine-hydrochloride in 100 cc. of water is mixed with a solution of 3.6 g. of sodium penicillin G in 25 cc. of water. A fine crystalline magma is obtained at once; it is washed with water and dried over calcium chloride under reduced pressure. Yield: 5 g. of a faintly yellow, voluminous powder which is very sparingly soluble in cold water. It melts at 143° C.–145° C. with decomposition.

Example 2

0.57 g. of 9-hydroxyethylamino-acridine-hydrochloride is dissolved in 25 cc. of water. This solution is mixed with a solution of 0.57 g. of sodium penicillin G in 5 cc. of water; a yellow sirupy precipitate is obtained which after standing for a prolonged time in the cold and on being rubbed with a glass rod, forms a voluminous mass; it is filtered with suction and washed with water. After drying over calcium chloride under reduced pressure, a yellow voluminous powder is obtained which is sparingly soluble in cold water. Yield: 1 g. The product melts at 103° C.–105° C. with decomposition after beginning to soften at 80° C.

Example 3

By mixing a solution of 3 g. of sodium penicillin G in 25 cc. of water with a solution of 2.5 g. of 2-ethoxy-9-ethylamino-acridine-hydrochloride in 100 cc. of water, a yellow finely crystalline precipitate is formed at once. After standing in ice, it is filtered with suction, washed with cold water and dried over calcium chloride under reduced pressure. Yield: 4.7 g. of a golden yellow powder which is very sparingly soluble in cold water. It melts at 115° C.–120° C. with decomposition.

Example 4

2.5 g. of 3.6-diamino-acridine-hydrochloride are dissolved in 40 cc. of water and, while cooling with ice, a solution of 3.7 g. of sodium penicillin G in 10 cc. of water is added. The oily product which precipitates, becomes crystalline on rubbing for a short time. The red penicillin salt is filtered with suction and washed subsequently with a little water. Yield: 4.8 g.; it melts at 155° C. with decomposition.

Example 5

A solution of 3.6 g. of sodium penicillin G in 20 cc. of water is mixed with a solution of 3.4 g. of 2-ethoxy-6.9-diamino-acridine-lactate in 120 cc. of water, while cooling with ice. The penicillin salt thereby precipitates as an oil which, after a short time, solidifies to a yellow crystalline powder. The salt is filtered with suction and washed subsequently with water. Yield: 5.7 g.; the product melts at 101° C.–103° C. with decomposition.

Example 6

5.5 g. of 2.3-dimethoxy-6-nitro-9-(gamma-diethyl-amino-beta-hydroxypropyl)-amino-acridine hydrochloride and 7.5 g. of sodium penicillin G are dissolved in about 100 cc. of cold aqueous methanol of about 60% strength. The solution is filtered and introduced, drop by drop, into water of 0° C., while stirring. The dipenicillin salt of 2.3-dimethoxy-6-nitro - 9 - (gamma-diethylamino-beta-hydroxypropyl)-amino-acridine precipitates in the form of flakes. It is rapidly filtered with suction, while cooling, and dried in the exsiccator. The yields is nearly quantitative. The product decomposes at 99° C.

We claim:
The penicillin G salt of 2-ethoxy-6.9-diamino-acridine.

References Cited in the file of this patent
UNITED STATES PATENTS

| Number | Name | Date |
|---|---|---|
| 2,527,810 | Goldberg et al. | Oct. 31, 1950 |
| 2,567,679 | Rhodehamel | Sept. 11, 1951 |
| 2,579,185 | Granatek | Dec. 18, 1951 |

OTHER REFERENCES

Monash, "Science," vol. 107, October 17, 1947, p. 370.
Scudi et al., "J. Biol. Chem.," vol. 164, July–August, 1946, pp. 195, 199.
Pratt et al., "J. Bact.," vol. 55 (1948), pp. 731 and 733.
"Am. J. of Pharmacy," July, 1945, p. 253.
"The Chemistry of Penicillin" (Princeton U. Press, 1949), p. 90.
Abraham, "Brit. J. Exptl. Path.," vol. 23 (1942), p. 108.